Patented Sept. 8, 1953

2,651,568

UNITED STATES PATENT OFFICE 2,651,568

PROCESS FOR PREVENTING THE PRECIPITATION OF INSOLUBLE SALTS OF PHENOXYACETIC ACIDS

Emile Leblon, Brussels, Belgium, assignor to Solvay & Cie, Brussels, Belgium, a Belgian company No Drawing. Application December 5, 1951, Serial No. 260,114. In Belgium December 7, 1950

4 Claims. (Cl. 71—2.6)

The present invention relates to improvements in processes of using compositions whose active element is constituted by synthetic phytohormones such as the soluble salts of substituted phenoxyacetic acids. It is well known that such compositions, for example those which contain soluble salts of 2,4-dichlorophenoxyacetic acid, 2-methyl-4-chlorophenoxyacetic acid or 2,4,5-trichlorophenoxyacetic acid are suitable for use as selective herbicides or as phytohormones.

Dilute solutions of these salts are prepared for agricultural use by dissolving the solid product or by diluting concentrated solutions. When hard water is used for this preparation there are formed calcium and/or magnesium salts of phenoxyacetic acids, which are insoluble in aqueous liquids. Since these insoluble salts have a much slower action than the soluble salts, there results an important loss of active element. Moreover, as the soluble salts of the synthetic phytohormones have an extremely high power, only very small quantities thereof are sprayed on the plants to be treated, hence the necessity of using dilute solutions and spraying apparatus having a very small delivery. The insoluble salts formed in the course of the dissolution or of the dilution of active compounds in hard waters give rise to obstruction of spraying apparatus with delivery nozzles or apertures of small cross-section.

In order to avoid these inconveniences it has been proposed to add to commercial compositions comprising synthetic phytohormones citric acid, ethylene diamine tetraacetic acid, methylcellulose or a compound obtained by condensing ethylene oxide with abietic acid, tall oil or colophane.

We have observed that 10% solutions of sodium 2-methyl-4-chlorophenoxyacetate do not form any precipitate when diluted with hard water, while 30% solutions of this salt, and likewise sodium 2,4-dichlorophenoxyacetate, form a relatively abundant precipitate of insoluble salts.

We have been able to establish that this difference in the behaviour of these solutions with hard waters was due to the presence of soluble diglycolate which is present in appreciable quantity in the 10% solution of 2-methyl-4-chlorophenoxyacetate, and not in concentrated solutions at 30% and not at all in sodium 2,4-dichlorophenoxyacetate.

The object of this invention is to provide a process based on this discovery, for preventing the formation of insoluble compounds when dissolving or diluting soluble salts of phenoxyacetic acid with hard waters, the process according to our invention consisting in adding before or during the dissolution or the dilution operation quantities of a soluble salt of diglycolic acid at least sufficient to prevent the precipitation of insoluble salts due to the hardness of water. By way of example, to a concentrated solution containing over 20% by weight of sodium 2-methyl-4-chlorophenoxyacetates we add 2.5% by weight of a water soluble salt of diglycolic acid in order that no precipitation shall occur at the usual concentrations.

The salt of diglycolic acid may be a sodium, a potassium or an ammonium salt. These salts are advantageously mixed with the solid composition containing the soluble salt of phenoxyacetic acid or they may be dissolved in the concentrated solution of one or more of these active salts. However, they may also be added when performing the dissolution or the dilution or they may be dissolved beforehand in the hard water used for preparing the diluted solution.

Among the soluble salts of phenoxyacetic acids the invention is particularly applicable to alkali metal salts such as sodium, potassium and lithium salts, ammonium salts, amine salts of phenoxyacetic acids such as 2,4-dichlorophenoxyacetic acid, 2-methyl-4-chlorophenoxyacetic acid, 2,4,5-trichlorophenoxyacetic acid, their isomers or their homologues.

Example I

In one litre of a concentrated solution containing 40% by weight of a mixture of sodium 2-methyl-4-chlorophenoxyacetate, sodium 2-methyl-6-chlorophenoxyacetate and sodium 2-methyl-4,6-dichlorophenoxyacetate, we dissolve 50 gr. of anhydrous sodium diglycolate. The solution thus prepared is brought to a concentration of 3% of phenoxyacetic compounds by dilution with hard water at 50° on the Boutron-Boudet scale without any calcium salts precipitating.

A test made with a solution in which were present only small quantities of glycolates obtained by hydrolysis of monochloroacetic acid occurring in the course of condensation of chlorocresols in caustic solution, had shown an abundant precipitation of calcium salts when the concentrated solution was diluted.

Example II

To 1 kg. of sodium 2,4-dichlorophenoxyacetate we mix 100 gr. of sodium diglycolate. The mixture is dissolved in 33 litres of water at 50° Boutron-Boudet thereby producing a solution containing about 3% of sodium 2,4-dichlorophenoxyacetate without the slightest precipitation of calcium compounds being observed.

I claim:

1. In a process for preventing the formation of insoluble compounds when preparing dilute solutions of soluble salts of phenoxyacetic acids with hard water, said soluble salts of phenoxyacetic acids being employed in a form comprising said salts in a concentration substantially in excess of 10%, the step of adding to said salts a soluble salt of diglycolic acid in amount sufficient to inhibit precipitation of said insoluble compounds from said hard water.

2. In a process for preventing the formation of insoluble compounds when preparing dilute solutions of soluble salts of phenoxyacetic acids with hard water, said soluble salts of phenoxyacetic acids being employed in a form comprising said salts in a concentration substantially in excess of 10%, the step of adding to the dilution water a soluble salt of diglycolic acid in amount sufficient to inhibit precipitation of said insoluble compounds from said hard water.

3. In a process for preparing dilute aqueous solutions of sodium 2,4-dichlorophenoxyacetate from solid sodium 2,4-dichlorophenoxyacetate and hard water, the step of adding a soluble salt of diglycolic acid in amount sufficient to inhibit precipitation of said insoluble compounds from said hard water.

4. In a process for preparing dilute aqueous solutions of sodium 2-methyl-4-chlorophenoxyacetate from concentrated solutions of said compound having a concentration of said compound substantially in excess of 10% and hard water the step of adding a soluble salt of diglycolic acid in amount sufficient to inhibit precipitation of said insoluble compounds from said hard water.

EMILE LEBLON.

References Cited in the file of this patent

FOREIGN PATENTS

| Number | Country | Date |
|---|---|---|
| 623,217 | Great Britain | May 13, 1949 |